US012725093B2

(12) United States Patent
Chandrasekaran et al.

(10) Patent No.: US 12,725,093 B2
(45) Date of Patent: Sep. 1, 2026

(54) SYSTEMS AND METHODS FOR MULTI-FACTOR MODEL SELECTION AND PROMOTION

(71) Applicant: Dell Products L.P., Round Rock, TX (US)

(72) Inventors: Balasubramanian Chandrasekaran, Austin, TX (US); Lucas Avery Wilson, Cedar Park, TX (US); Dharmesh M. Patel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 979 days.

(21) Appl. No.: 17/704,121

(22) Filed: Mar. 25, 2022

(65) Prior Publication Data

US 2023/0306314 A1 Sep. 28, 2023

(51) Int. Cl.
*G06N 20/20* (2019.01)

(52) U.S. Cl.
CPC .................................. *G06N 20/20* (2019.01)

(58) Field of Classification Search
CPC .................................................... G06N 20/20
USPC ........................................................... 706/12
See application file for complete search history.

(56) References Cited

U.S. PATENT DOCUMENTS 8,311,967 B1 * 11/2012 Lin ......................... G06N 5/04 706/62
11,004,135 B1 5/2021 Sandler et al.
11,182,691 B1 * 11/2021 Zhang .................... G06N 20/20
2017/0220407 A1 * 8/2017 Estrada ............... G06F 11/3495
2019/0042887 A1 2/2019 Nguyen et al.
2019/0050754 A1 * 2/2019 Assem Aly Salama .................... H04L 41/16
2019/0102700 A1 4/2019 Babu et al.
2019/0354809 A1 * 11/2019 Ralhan .................. G06F 16/116
2019/0391956 A1 * 12/2019 Kozhaya ............ G06F 16/3329
2020/0234158 A1 7/2020 Pai et al.
2020/0257302 A1 8/2020 Soltani Bozchalooi
2020/0387836 A1 12/2020 Nasr-azadani et al.
2021/0006472 A1 1/2021 Khaspa et al.
2021/0365813 A1 11/2021 Nakano et al.
2022/0405659 A1 12/2022 Muthuswamy et al.
2023/0133373 A1 5/2023 Mcgonnell et al.

(Continued)

FOREIGN PATENT DOCUMENTS

WO 2022072237 A1 4/2022

OTHER PUBLICATIONS

Andrew Or et al., Resource Elasticity in Distributed Deep Learning, 1-12, 2020 (12 pages).

(Continued)

*Primary Examiner* — Matthew Ell
*Assistant Examiner* — Nicholas Hasty
(74) *Attorney, Agent, or Firm* — Chamberlain, Hrdlicka, White, Williams & Aughtry; Aly Z. Dossa

(57) ABSTRACT

A model selection method includes: receiving a request to train or validate a plurality of models where the request includes training data and one or more trigger conditions; obtaining the models from a model catalog and training the models using the training data to obtain results for each of the one or more trigger conditions; and selecting, based on the results of each of the one or more trigger conditions and from among the models, a best model to be pushed to production.

4 Claims, 10 Drawing Sheets

(56) References Cited

U.S. PATENT DOCUMENTS

2023/0169612 A1 6/2023 Liguori et al.

OTHER PUBLICATIONS

Jia Guo et al., Predictive Resource Allocation with Deep Learning, 1-7, 2018 (7 pages).
Marcel Wagenlander et al., Spotnik Designing Distributed Machine Learning for Transient Cloud Resources, 1-8, 2020 (8 pages).
Yanghua Peng et al., Optimus An Efficient Dynamic Resource Scheduler for Deep Learning Clusters, 1-14, 2018 (14 pages).

* cited by examiner

Model Lifecycle Manager Agent(s) 182

Model Catalog 184

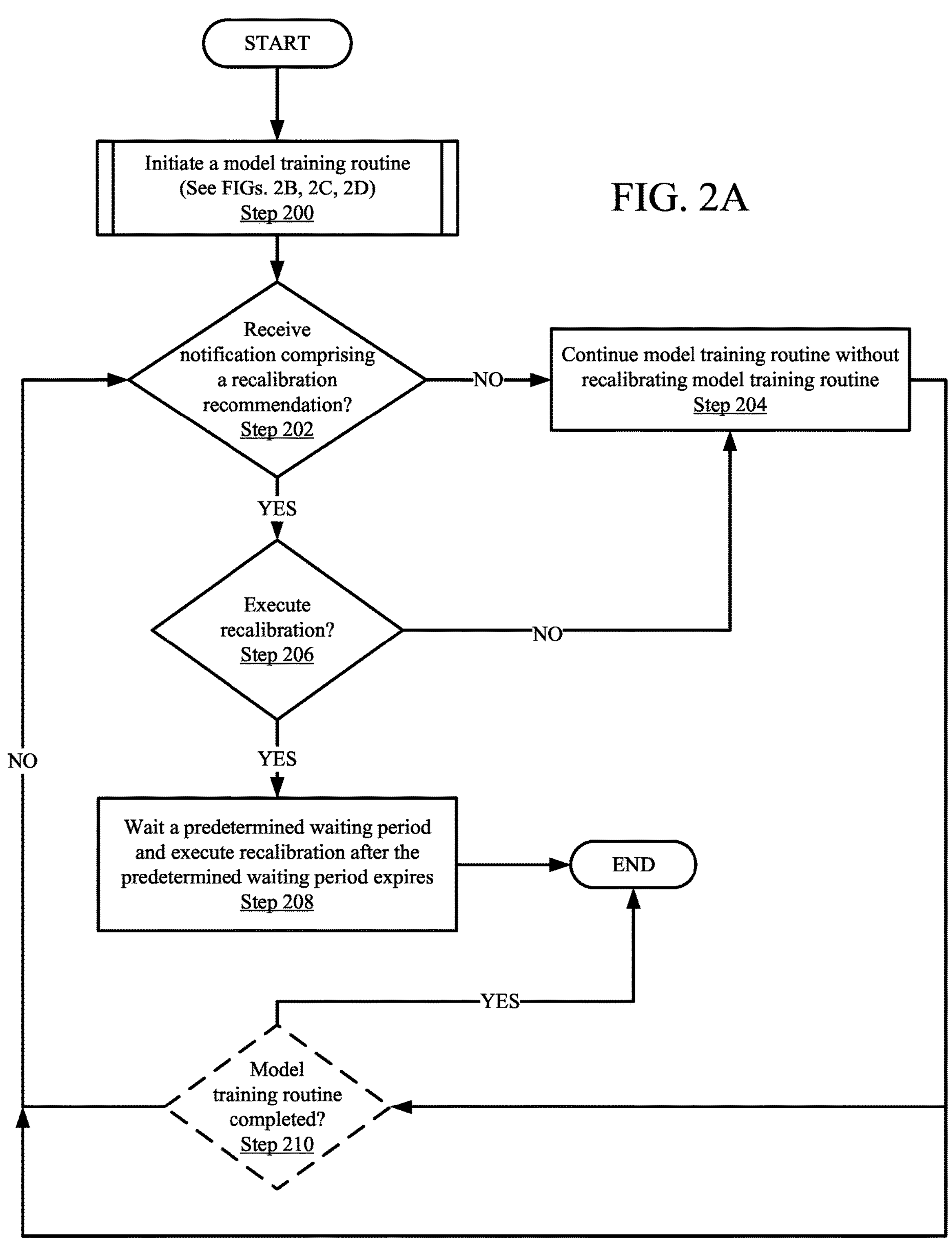
START
Initiate a model training routine
(See FIGs. 2B, 2C, 2D)
Step 200
FIG. 2A
Receive notification comprising a recalibration recommendation?
Step 202
NO
Continue model training routine without recalibrating model training routine
Step 204
YES
Execute recalibration?
Step 206
NO
YES
NO
Wait a predetermined waiting period and execute recalibration after the predetermined waiting period expires
Step 208
END
YES
Model training routine completed?
Step 210

SYSTEMS AND METHODS FOR MULTI-FACTOR MODEL SELECTION AND PROMOTION

BACKGROUND

Models (e.g., artificial intelligence (AI) models, machine learning models, etc.) are able to emulate logical decision-making based on available data. However, not many models make it past the prototyping phase to actual production. Therefore, users wish to be able to manage these models during the models' lifecycle to more effectively push these models to production.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIGS. 2A-2D show flowcharts in accordance with one or more embodiments.

DETAILED DESCRIPTION

Figure 1A:
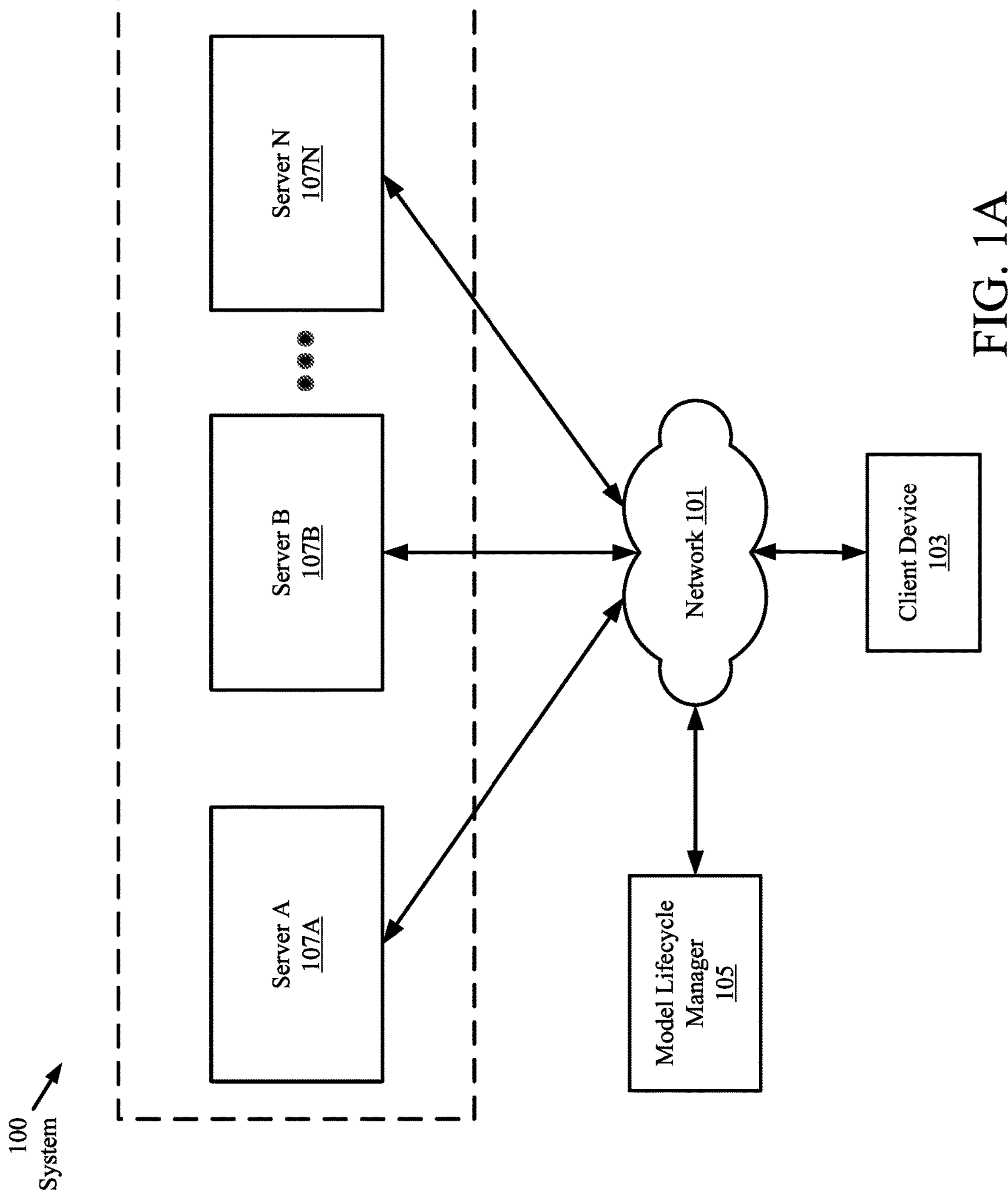
FIG. 1A shows a system in accordance with one or more embodiments.

Specific embodiments will now be described with reference to the accompanying figures.

In the below description, numerous details are set forth as examples of embodiments described herein. It will be understood by those skilled in the art, that have the benefit of this Detailed Description, that one or more embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components.

Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

One or more embodiments disclosed herein are directed to systems and methods for managing a lifecycle of one or more models (e.g., artificial intelligence (AI) models, machine learning models, etc.). More specifically, in one or more embodiments, multiple parameters (also referred to herein as "trigger conditions") in addition to model accuracy may be applied during a model selection process to select one or more models to be pushed to production. Additionally, in one or more embodiments, instead of archiving (e.g., discarding and no longer using) models that were not selected to be pushed to production, non-selected models may be ranked and re-trained using new data to determine whether any of the non-selected models would perform better with the new data. Furthermore, in one or more embodiments, model training routines that are currently being executed on one or more computing devices (also referred to herein as "existing model training routines") connected to a network may be recalibrated based on new computing resources becoming available on the network. Further, in one or more embodiments, a model's lifecycle (e.g., development, production, maintenance, etc.) may be managed using various criteria (e.g., cost, time, accuracy, etc.) set by a user to fit the user's needs (e.g., business plans, budget, uses for the models, etc.).

The various embodiments discussed above are now described in more detail below.

FIG. 1A shows a system (100) in accordance with one or more embodiments. The system (100) includes a client device (103) and a model lifecycle manager (105) connected to one or more servers (107A, 107N) through a network (101). Each of these components of the system (100) will be described in more detail below.

In one or more embodiments disclosed herein, the network (101) may be a medium through which the client device (103), the model lifecycle manager (105), and the servers (107A, 107N) are operatively connected. In one embodiment of the disclosure, the network may include other devices (or systems) (not shown) that facilitate communication between the aforementioned components. As such, in one embodiment of the disclosure, the network may include any combination of local and/or wide area (e.g., Internet) network segments that may be wire-based and/or wireless and that may use any combination of wired and/or wireless communication protocols.

In one or more embodiments disclosed herein, the client device (103) may be a physical device or a virtual device (i.e., a virtual machine executing on one or more physical devices) such as a personal computing system (e.g., a laptop, a cell phone, a tablet computer, a virtual machine executing on a server, etc.) of a user (i.e., a customer of the provider of the server cluster (105)). For example, the client device (103) may be a computing system (e.g., 400, FIG. 4) as discussed below in more detail in FIG. 4.

In one or more embodiments, the system (100) may have multiple ones of the client device (103) (i.e., may have one or more client devices (103)). Each of the client devices (103) may be directly (or operatively, e.g., via the network (101)) connected to at least the model lifecycle manager (105) and/or one of the servers (107A, 107N).

In one or more embodiments disclosed herein, the model lifecycle manager (105) may be a physical device or a virtual device (i.e., a virtual machine executing on one or more physical devices) such as a personal computing system (e.g., a laptop, a cell phone, a tablet computer, a virtual machine executing on a server, etc.). For example, the model lifecycle manager (105) may be a computing system (e.g., 400, FIG. 4) as discussed below in more detail in FIG. 4.

In one or more embodiments, the system (100) may have multiple ones of the model lifecycle manager (105) (i.e., may have one or more model lifecycle managers (105)). Each of the model lifecycle managers (105) may be directly (or operatively, e.g., via the network (101)) connected to at least the client device (103) and/or one of the servers (107A, 107N).

Additional details of the model lifecycle manager (105) and the services provided by the model lifecycle manager (105) are discussed below in reference to FIGS. 1C and 2A-2D.

In one or more embodiments disclosed herein, a server (107A, 107N) may be a physical device, a group of physical devices, or a virtual device (discussed above) that provides functionalities (i.e., services) to other devices (e.g., the client device (103), another server (107A, 107N), etc.) connected (either directly or operatively through the network (101) to the server (107A, 107N). A single server (107A, 107N) may be connected to (i.e., serve) multiple ones of the client device (103). Additionally, a single client device (103) may be connected to (i.e., use the services provided by) multiple servers (107A, 107N).

Additional details of the server (107A, 107N) and the services provided by the server (107A, 107N) are discussed below in reference to FIGS. 1B and 2A-2D.

Although the system (100) is shown as having four components (101, 103, 105, 107), in other embodiments, the system (100) may have more (e.g., network devices such as switches, routers, etc.) or fewer components. Further, processes executed by each component (described in more detail below) may be split across components or combined into a single component (e.g., processes executed by the model lifecycle manager (105) may also be executed by any one of the servers (107A, 107N)). Further still, each component (101, 103, 105, 107) may be utilized multiple times to carry out an iterative operation.

Figure 1B:
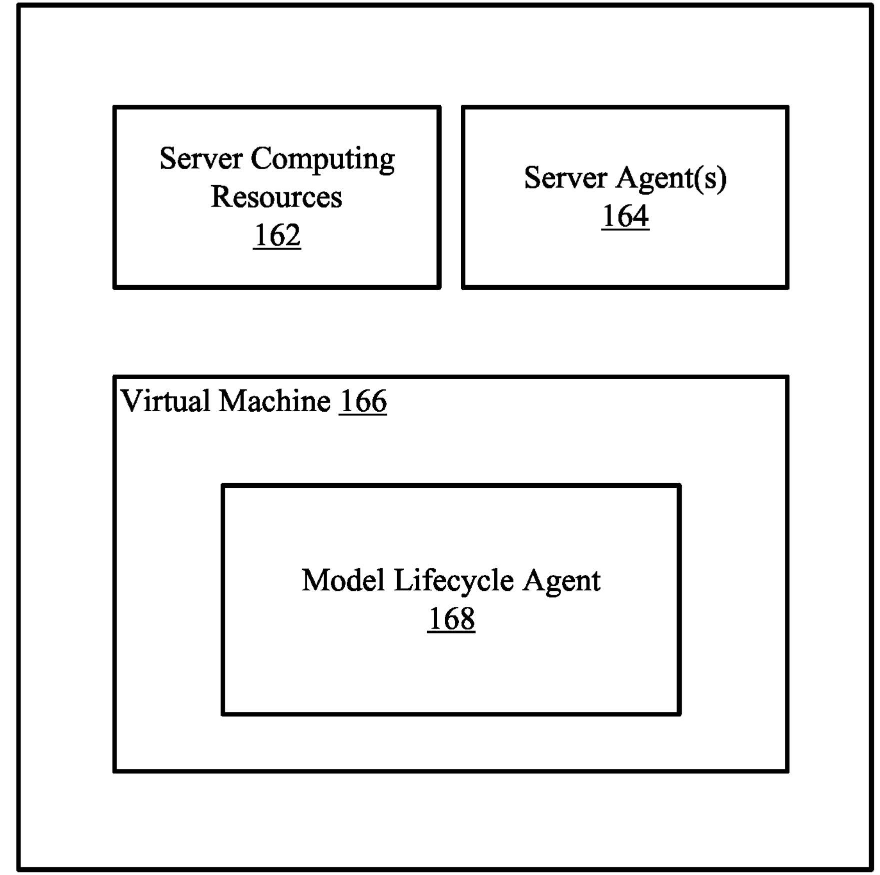
FIG. 1B shows a diagram of an example server in accordance with one or more embodiments.

Turning now to FIG. 1B, FIG. 1B shows an example server (160) in accordance with one or more embodiments of this disclosure. The server (160) may be the same as any of the servers (107A, 107N) described above in FIG. 1A. In addition to the components discussed above in reference to FIG. 1A, the server (160) further includes: server computing resources (162) and one or more server agents (164). The server (160) may also be hosting a virtual machine (VM) (166) that includes a model lifecycle agent (168). Each of the components illustrated in FIG. 1B is described below.

In one or more embodiments disclosed herein, the server computing resources (162) may be any physical (e.g., hardware including volatile memory, non-volatile memory, central processing units (CPUs), graphical processing units (GPUs) general use GPUs (GUGPUs), network interface cards etc.) and/or virtual (e.g., software such as the operating system (OS), applications, etc.) component of limited availability installed within the server (160). The server computing resources (162) may be used by the server (160) (and any devices such as the model lifecycle manager (105) and/or the client device (103) connected to the server (160) to execute one or more processes (e.g., the processes discussed below in reference to FIGS. 2A-2D). As another non-limiting example, the server computing resources (162) may be utilized by one or more VMs (166) (discussed in more detail below) being hosted on the server (160).

In one or more embodiments disclosed herein, the server agent(s) (164) may be configured in hardware (e.g., circuitry), software, or any combination thereof (e.g., configured in any combination of the server computing resources (162)). The server agents (164) interacts with the other components (e.g., the server computing resources (162), the VM (166)) of the server (160) to facilitate the implementation of one or more protocols, services, and/or features of the server (160). For example, the server agents (164) may be used for performing one or more steps of processes in accordance with various embodiments of the disclosure (e.g., the processes discussed below in FIGS. 2A-2D). Additional details of processes executed by the server agents (164) are discussed below in FIGS. 2A-2D.

In one or more embodiments disclosed herein, the VM (166) may be a virtualization and/or emulation of a computer system (e.g., 400, FIG. 4) executing on the server (160) through the use of one or more of the server computing resources (162). In one or more embodiments, multiple ones of the VM (166) may be hosted on the server (160) while sharing use of the server computing resources (162). Each of the VMs (166) hosted on the server (160) may be configured to include a model lifecycle agent (168). The model lifecycle agent (168) may be configured in software as part of the VM to facilitate the implementation of one or more protocols, services, and/or features of the VM (166). For example, the model lifecycle agent (168) may be used for performing one or more steps of processes in accordance with various embodiments of the disclosure (e.g., the processes discussed below in FIGS. 2A-2D). Additional details of processes executed by the model lifecycle agent (168) are discussed below in FIGS. 2A-2D.

Figure 1C:
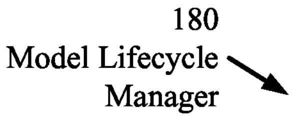
FIG. 1C shows a diagram of an example model lifecycle manager in accordance with one or more embodiments.

Turning now to FIG. 1C, FIG. 1C shows an example model lifecycle manager (180) in accordance with one or more embodiments of this disclosure. The model lifecycle manager (180) may be the same as the model lifecycle manager (105) described above in FIG. 1A. In addition to the components discussed above in reference to FIG. 1A, the model lifecycle manager (180) further includes: one or more model lifecycle manager agents (182) and a model catalog (184). Each of the components illustrated in FIG. 1C is described below.

In one or more embodiments disclosed herein, the model lifecycle manager agent(s) (182) may be configured in hardware (e.g., circuitry), software, or any combination thereof. The model lifecycle manager agent (182) interacts with the other components (e.g., the model catalog (184)) of the model lifecycle manager (180) to facilitate the implementation of one or more protocols, services, and/or features of the model lifecycle manager (180). For example, the model lifecycle manager agent (182) may be used for performing one or more steps of processes in accordance with various embodiments of the disclosure (e.g., the processes discussed below in FIGS. 2A-2D). Additional details of processes executed by the model lifecycle manager agent (182) are discussed below in FIGS. 2A-2D.

In one or more embodiments disclosed herein, the model catalog (184) may be configured as one or more data structures (e.g., lists, containers, etc.) stored in a storage (e.g., a combination or volatile and non-volatile memory) of the model lifecycle manager (180). Each model catalog (184) may be configured to store one or more models (e.g., AI models, machine learning models, etc.). The models stored in the model catalog (184) may be models in the prototyping phase (e.g., models that are currently being trained and/or optimized) and/or models that are currently in production. As another example, the model training manager (180) may include multiple ones of the model catalogs (184) (e.g., a model catalog (184) storing only models in the prototyping phase, a model catalog (184) storing only models that have been archived as a result of not being chose for production (discussed in more detail below), a model catalog (184) storing only models that are currently in production, and/or a model catalog (184) any combination of the above models).

Although the model lifecycle manager (180) is shown as having only two components (182, 184), the model lifecycle manager (180) may have additional components (e.g., combination of hardware and software components such as volatile and non-volatile memories, CPUs, GPUs, GUGPUs, OSs, etc.) without departing from the scope of one or more embodiments disclosed herein.

FIG. 2A shows a flowchart of a method in accordance with one or more embodiments of the invention. The method depicted in FIG. 2A may be performed to execute a process for recalibration of existing model training routines executing on a network (e.g., 101, FIG. 1A). The method shown in FIG. 2A may be performed by, for example, a combination of the client device (e.g., 103. FIG. 1A), the model lifecycle manager (e.g., 105, FIG. 1A), and one or more of the servers (e.g., 107A-107N, FIG. 1A).

While FIG. 2A is illustrated as a series of steps, any of the steps may be omitted, performed in a different order, additional steps may be included, and/or any or all of the steps may be performed in a parallel and/or partially overlapping manner without departing from the invention. Additionally, steps in FIG. 2A shown using broken lines may be optional steps within the method.

Initially, in Step 200, a model training routine is initiated on a sever. In one or more embodiments, the model training routine may be initiated on one or more VMs (e.g., 166, FIG. 1B) (or any other devices of the system (100) of FIG. 1A including any one of the servers (e.g., 107A-107N, FIG. 1A), other ones of the VM (e.g., 166, FIG. 1B) executing on the servers, a container, any resource abstraction, etc.) being hosted on the server. Alternatively, the model training routine may be initiated on one or more VMs being hosted across multiple ones of the server. As one non-limiting example, a single model training routine may be initiated on a first VM hosted on a first server and a second VM hosted on a second server (e.g., using synchronous data parallel training on a distributed neural network including both servers) because the server computing resources (e.g., 162) of a single server are insufficient to execute the model training routine.

In one or more embodiments, the model training routine may be initiated in response to a model training routine request transmitted by a user using the client device. As one example, the model training routine request may be transmitted from the client device to the model lifecycle manager, which will then transmit instructions to one or more servers to instantiate one or more VMs to execute the model training routine. Alternatively, the model training routine request may be transmitted directly from the client device to one or more servers, which will then coordinate with the model lifecycle manager to instantiate one or more VMs to execute the model training routine.

In one or more embodiments, the term "model training routine" is not limited to only a model initial development phase (discussed below in more detail) of a model, and may include other phases (e.g., a model production phase and a model update phase (discussed below in more detail)) of a model's lifecycle without departing from the scope of one or more embodiments disclosed herein. Additional details of the processes executed during a model training routine are discussed below in reference to FIGS. 2B-2D.

In Step 202, the server determines whether a notification comprising a recalibration recommendation (also referred to herein simply as "recommendation") for the existing model training routine has been received. In one or more embodiments, the notification containing the recalibration recommendation may be received from any device (e.g., the client device, another server, the model lifecycle manager, etc.) connected to the server via the network.

In one or more embodiments, the device transmitting the notification containing the recalibration recommendation to the server may compile the notification in response to determining that there is a change in available resources (e.g., server computing resources) within the network. A change in available resources within the network may occur whenever there is any increase or decrease (at any point in time) in the resources available to any devices connected on the network. For example, changes in available resources within the network may include, but are not limited to: additional server computing resources (e.g., a GPU) becoming available on a server, a server being taken down or maintenance, a lost connection to one or more servers, a new server being instantiated and connected to the network, a taken down server that is being redeployed, etc.).

In one or more embodiments, the change in available resources within the network may be compiled into network resource information to be included in the notification. The network resource information may be used to compile the recalibration recommendation. The recalibration recommendation may include one or more recommendations (compiled using the network resource information) specifying a change to be implemented to an existing model training routine. Changes to be implemented to an existing model training routine may include, but are not limited to: creating a new VM to share in the execution of the existing model training routine with an existing VM; deleting a current VM executing all or part of the existing model training routine; migrating (e.g., moving) one or more VMs executing all of part of the existing model training routine from one or more servers hosting the VMs to different servers; reserving and/or deleting the reservation of (by one or more VMs) server computing resources for executing the existing model training routine; etc.). An example change to be implemented to an existing model training routine is shown in more detail below in reference to FIGS. 3A-3B Other changes not described above that could affect a processing time (e.g., shorten or lengthen) of an existing model training routine may be included without departing from the scope of one or more embodiments disclosed herein. As such, having access to the network resource information advantageously allows the VM(s) executing one or more existing model training routines to become more aware of the resources available on the network such that one or more of the above-discussed changes can be applied to improve the execution of the existing model training routine.

In one or more embodiments, if the determination in Step 202 is NO (i.e., no notifications comprising a recalibration recommendation for the existing model training routine has been received by the server), the method proceeds to Step 204 where the server continues to execute the model training routine without recalibrating the existing model training routine. After continuing Alternatively, if the determination in Step 202 is YES (i.e., the server receives (at any point in time while the existing model training routine is being executed) a notification comprising a recalibration recommendation for the existing model training routine), the method proceeds to Step 206 (discussed below).

In Step 206, a determination is made (e.g., by the server agent (e.g., 164, FIG. 164, FIG. 1B) and/or the model lifecycle agent (e.g., 168, FIG. 1B) whether any of the recommendations specified by the recalibration recommendation should be executed to recalibrate the existing model training routine. In one or more embodiments, recalibrating the existing model training routine includes applying one or more of the above-discussed changes to be implemented to an existing model routine to the existing model training routine.

In one or more embodiments, the determination to execute recalibration of the existing model training routine may be based on (e.g., guided by) one or more policies and priorities (collectively referred to herein as "policy") associated with the existing model training routine. The policies and priorities may include, for example, but are not limited to: a policy specifying that the recalibration recommendation can be ignored; a policy specifying that no recalibration of the existing model training routine is allowed; a policy specifying that no recalibration is allowed after a certain point in time (e.g., if the existing model training routine is already half completed, if it is determined that the existing model training routine can be completed within a predetermined time, etc.), a policy specifying that recalibration should be executed if the recalibration can shorten a processing time of the model training routine; a policy specifying that recalibration should be executed if an existing model training routine executing across two VMs can be condensed into a single VM; etc. Other policies effecting whether an existing model training routine should be recalibrated that are not described above can also be included without departing from the scope of one or more embodiments disclosed herein.

In one or more embodiments, if it is determined in Step 206 that recalibration should not be executed (e.g., NO in Step 206), the method returns to Step 204 where the execution of the existing model training routine is continued without recalibrating the existing model training routine until execution of the existing model training routine is completed or until it is determined (in Step 202) that another notification comprising a recalibration recommendation has been received. For example, a determination may be made based on the policies and priorities associated with the existing model training routine not to implement (e.g., ignore) the recalibration recommendation. Alternatively, if it is determined in Step 206 that recalibration should be executed (e.g., YES in Step 206), the method proceeds to Step 208 (discussed below).

In Step 208, the server waits for a predetermined waiting period and executes the recalibration of the existing model training routine after the predetermined waiting period expires. In one or more embodiments, the predetermined waiting period may be determined based on the policies and priorities associated with the existing model training routine. More specifically, the policies and priorities may be used to determine an optimal predetermined waiting period that would cause the least amount of negative impact on the existing model training routine when recalibration is executed on the existing model training routine. For example, assume that the existing model training routine is being executed using a synchronous data parallel training process on a distributed neural network. The optimal predetermined waiting period for recalibrating such an existing model training routine may be determined to be an amount of time required for an all reduce operation associated with the existing model training routine to be completed. As such, having this predetermined waiting period advantageously allows the existing model training routine to be recalibrated into an environment with more computing resources while causing the least amount of negative impacts (e.g., data loss, delays, etc.) to the existing model training routine during the recalibration.

In one or more embodiments, once the predetermined waiting period has been determined, the server may transmit a response including the predetermined waiting period to the device that transmitted the notification with the recalibration recommendation to the server.

In one or more embodiments, as one example of a recalibration that could be executed, the execution of the existing model training routine may first be completely stopped on the server. A copy (e.g., a snapshot) of the existing model training routine including all of a current progress completed by the existing model training routine may be generated (and stored on the server and/or any other device connected to the network) after the execution has been stopped. This copy may then be restarted on a completely different set of resources (e.g., restarted on a completely different server or across multiple different servers, etc.) of the same network. Alternatively, the copy may be restarted on devices associated with a completely different network. In one or more embodiments, the existing model training routine may be deleted from the server after the copy has been generated and stored.

Turning now to Step 210, in Step 210, in response to no recalibration being executed on the existing model training routine (e.g., following Step 204), the server may determine whether execution of the existing model training routine is completed. This determination may be done routinely at a time period set by the user or by an administrator of the server. In response to determining that execution of the model training routine is completed (e.g., YES in Step 210), the method ends and the results of the model training routine are reported (e.g., to the client device and/or the model lifecycle manager) to be presented to a user who initiated the model training routine (e.g., the user who submitted the model training routine request in Step 200). Alternatively, in response to determining that the model training routine is still being executed (e.g., NO in Step 210), the method returns to Step 202.

Figure 2B:
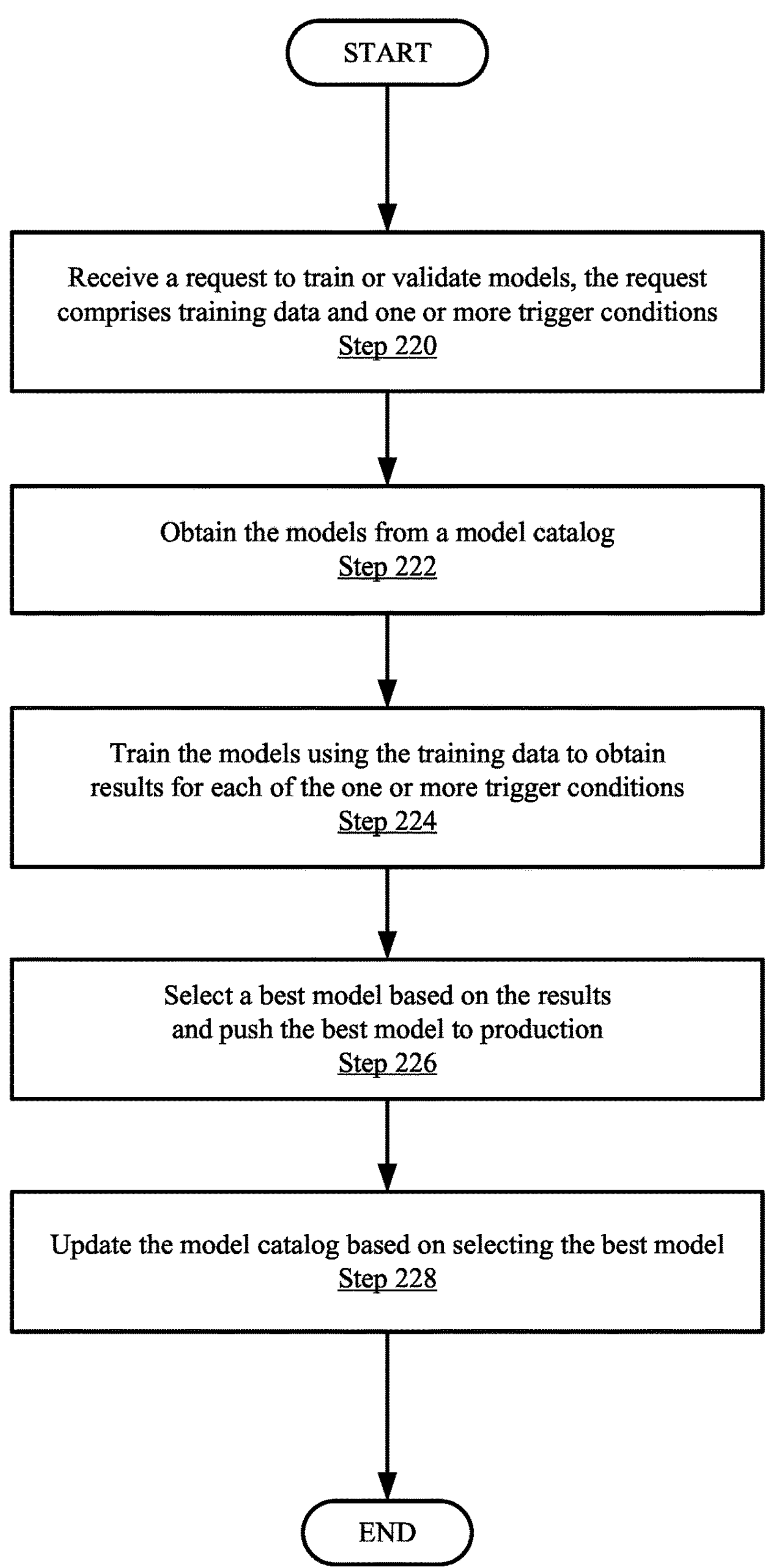

FIG. 2B shows a flowchart of a method in accordance with one or more embodiments of the invention. The method depicted in FIG. 2B may be performed to execute a process for initiating a model training routine as discussed above in Step 200 of FIG. 2A. The method shown in FIG. 2B may be performed by, for example, a combination of the model lifecycle manager (e.g., 105, FIG. 1A) and one or more of the servers (e.g., 107A-107N, FIG. 1A).

While FIG. 2B is illustrated as a series of steps, any of the steps may be omitted, performed in a different order, additional steps may be included, and/or any or all of the steps may be performed in a parallel and/or partially overlapping manner without departing from the invention.

In Step 220, a request to train models is received (e.g., by the server agent of a server and/or by the model lifecycle agent of a VM hosted on the server). This request may be the same as the model training routine request received in Step 200 of FIG. 2A. In one or more embodiments, the request may also be a request to validate a model. More specifically, validating a model may include evaluating how a model performs (e.g., using multiple factor validation) with respect to new ground-truth containing data.

In one or more embodiments, the request may include training data and one or more training conditions. The training data may include ground-truth data, and may be a new set of data that has not yet been used to train the models.

In one or more embodiments, the one or more trigger conditions may include restrictions and/or requirements based on one or more parameters used to evaluate a performance of the models. For example, the parameters may include, but are not limited to: an accuracy of a model (also referred to herein as "model accuracy"), a size of the model (also referred to herein as "model size"), amount of computing resources required for training a model (also referred to herein as "required computing resources for model training"), latency (e.g., response time) of a model (also referred to herein as "model latency"). The restrictions and/or requirements may be set by a user transmitting the request received in Step 220, and may include, but not limited to: a threshold for each of the parameters (e.g., model latency should be less than a predetermined value set by the user), a prioritization of the parameters (e.g., models with a model size no larger than a value set by the user should be prioritized to be selected), etc. Other parameters not specified above may also be selected/considered without departing from the scope of one or more embodiments disclosed herein.

In one or more embodiments, all of the above-discussed parameters may be used to evaluate the performance of the models. Alternatively, only some of the above-discussed parameters may be used to evaluate the performance of the models.

In Step 222, in response to receiving the request in Step 220, models are obtained from a model catalog (e.g., 184, FIG. 1C). In one or more embodiments, the models to be obtained from the model catalog may be specified in the request. The VM (or any other devices of the system (100) of FIG. 1A including any one of the servers (e.g., 107A-107N, FIG. 1A), other ones of the VM (e.g., 166, FIG. 1B) executing on the servers, a container, any resource abstraction, etc.) receiving the request may then retrieve the specified models from the model lifecycle manager (e.g., 180, FIG. 1C) storing the model catalog. Alternatively, the model lifecycle manager may also receive a copy of the request and transmit the models specified in the request to the VM. In one or more embodiments, all of the models in the model catalog may be specified in the request. Alternatively, only a portion of models in the model catalog may be specified in the request.

In Step 224, the models obtained from the model catalog are trained using the training data specified in the request to obtain results for each of the one or more trigger conditions also specified in the request. For example, if the request specifies the trigger conditions of model accuracy and model latency, each obtained model will be trained using the training data to at least produce results directed to model accuracy and model latency.

In one or more embodiments, the training of the models (e.g., the model training routine) may be executed at any time. Alternatively, as discussed in more detail below in FIG. 2D, the training of the models may be executed during a predetermined model training schedule (e.g., during non-peak hours of computing resource usage within the network).

In Step 226, a best model is selected based on the results and the best model is pushed to production (e.g., pushed to a model production phase). In the context of one or more embodiments disclosed herein, the "best model" refers to the model (within all the models that were trained using the training data) that produced the best training results based on the restrictions and/or requirements set by the user. For example, assume that three models (model A, model B, and model C) were trained. Model A produced training results of 91% model accuracy and 1 ms model latency. Model B produced a training results of 90% model accuracy and 0.5 ms model latency. Model C produced training results of 88% model accuracy and 2 ms model latency. Further assume that the trigger conditions were model accuracy and model latency with restrictions and/or requirements specifying that lower model latency should be prioritized over model accuracy and that model accuracy should be at least 90%. In such an example, model B having the lowest model latency and meeting the threshold of at least 90% model accuracy will be selected as the "best model."

Such selection of a best model based on the restrictions and/or requirements in view of having multiple-parameters (e.g., a multi-factor evaluation) advantageously allows models better fitting a user's needs to be selected when compared to just evaluating a models based on a single parameter (e.g., conventionally only model accuracy). For example, continuing with the above need (as shown through the restrictions and/or requirements) a model with a lowest model latency. Thus, only evaluating models (using conventional methods) based on model accuracy will not result in the user receiving the best model fitting the user's needs.

In Step 228, the model catalog is updated based on the selection of the best model in Step 226. In one or more embodiments, the model catalog may be updated to remove all data associated with the best model selected in Step 226. The model catalog may also be updated to archive all non-selected models. Alternatively, the model catalog may also be updated to include a ranking of all non-selected models and a total number of remaining models after the removal of the best model while not archiving the non-selected models. The ranking of the non-selected models may be based on the results produced in Step 224. For example, using the same example above including models A-C, model A may be ranked above model C based on comparing the training results of these two models to the restrictions and/or requirements of the trigger conditions. This ranking of model A being above model C may then be reflected in the model catalog.

Figure 2C:
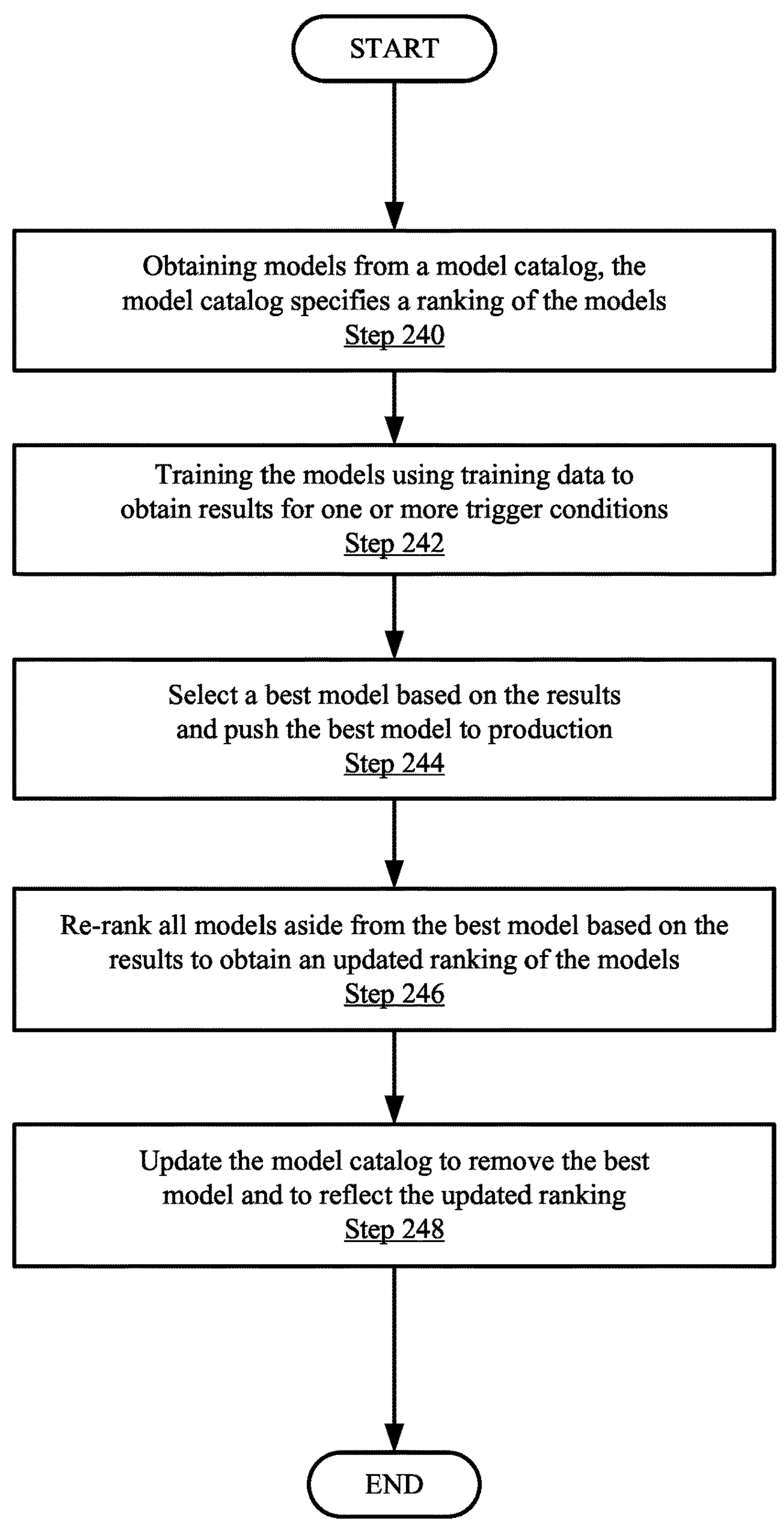

Turning now to FIG. 2C, FIG. 2C shows a flowchart of a method in accordance with one or more embodiments of the invention. The method depicted in FIG. 2C may be performed to execute a process for initiating a model training routine as discussed above in Step 200 of FIG. 2A. The method shown in FIG. 2C may be performed by, for example, a combination of the model lifecycle manager (e.g., 105, FIG. 1A) and one or more of the servers (e.g., 107A-107N, FIG. 1A).

While FIG. 2C is illustrated as a series of steps, any of the steps may be omitted, performed in a different order, additional steps may be included, and/or any or all of the steps may be performed in a parallel and/or partially overlapping manner without departing from the invention.

In Step 240, models are obtained from a model catalog. The models may be obtained in view of receiving a retraining request from a user. The model retraining request may be received after the model training process described above in FIG. 2B. As such, the models obtained from the model catalog may specify a ranking (e.g., the ranking discussed in Step 228 of FIG. 2B).

In one or more embodiments, the model retraining request may specify to obtain only a predetermined number of the highest ranking models (also referred to herein as a "top N number of models") (e.g., the top five ranking models in the model catalog where five is N). Alternatively, the model retraining request may specify to obtain a predetermined number of random models (irrespective of each model's ranking) from the model catalog, irrespective of each model's ranking, based on the total number of remaining models after the removal of the best model (also referred to herein as a "random number of M models from the total of K remaining models") (e.g., select five random models from the ten remaining models in the model catalog where five is M and 10 is K).

In one or more embodiments, the retraining request may further include training data including ground-truth data. This training data in the retraining request may be different from the training data included in the model training request received in Step 220 of FIG. 2B. Additionally, the retraining request may even further include one or more trigger conditions. These one or more trigger conditions specified in the retraining request may be the same one or more trigger conditions specified in the model training request received in Step 220 of FIG. 2B. Alternatively, these one or more trigger conditions specified in the retraining request may be different from the one or more trigger conditions specified in the model training request received in Step 220 of FIG. 2B.

In Step 242, the models obtained in Step 240 are trained using the training data included in the retraining request to obtain results for the one or more trigger conditions specified in the retraining request. Similar to Step 224 of FIG. 2B, in one or more embodiments, the training of the models (e.g., the model training routine) may be executed at any time. Alternatively, as discussed in more detail below in FIG. 2D, the training of the models may be executed during a predetermined model training schedule (e.g., during non-peak hours of computing resource usage within the network).

In Step 244, similar to Step 226 of FIG. 2B, a best model is selected based on the results from Step 242 and the best model is pushed to production (e.g., pushed to a model production phase).

In Step 246, after the best model is selected, the remaining models are re-ranked based on the results obtained in Step 242 to obtain an updated (e.g., new) ranking of the models. This is done similarly to the model ranking process discussed above in Step 228 of FIG. 2B.

In Step 248, the model catalog is updated to remove the best model and to reflect the updated ranking. In one or more embodiments, the model catalog is also updated to reflect the new total remaining number of models (e.g., K−1) after the removal of the best model from the model catalog. Such retraining of the remaining models as discussed above in the steps of FIG. 2C advantageously allows a user to determine whether any of the models remaining in the model catalog after Step 228 of FIG. 2B would perform better when retrained with new conditions (e.g., new training data under the same trigger conditions as the initial training). Maintaining a ranking of the models in the model catalog also advantageously allows users to leverage information from previous trainings in order to better optimize further trainings. Even further, selecting a random number of M models from the total of K remaining models advantageously allow for models that may have been lower performers to be reconsidered as new training data is available to retraining the remaining models.

Figure 2D:
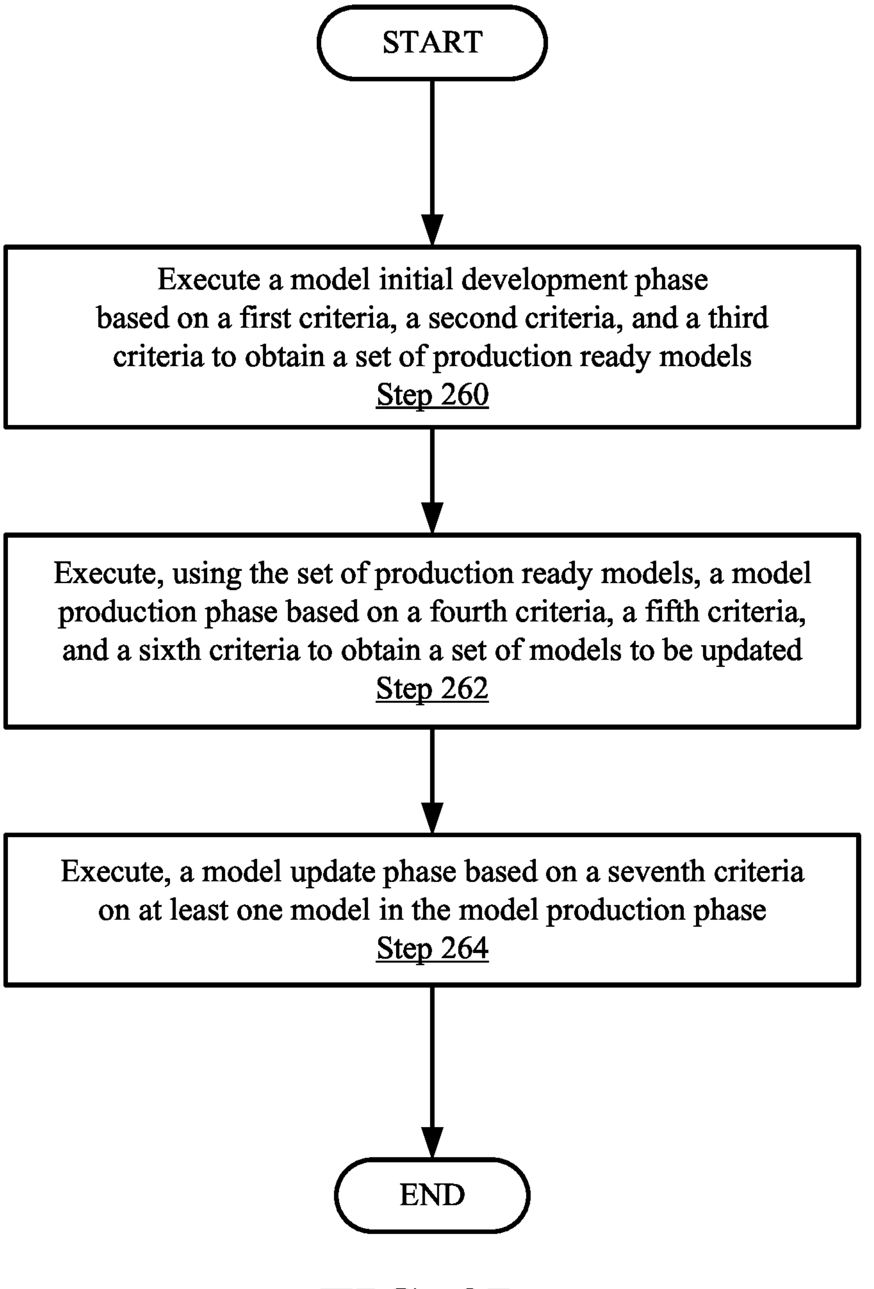

Turning now to FIG. 2D, FIG. 2D shows a flowchart of a method in accordance with one or more embodiments of the invention. The method depicted in FIG. 2D may be performed to execute a process for managing a model's lifecycle (e.g., through the execution of one or more model training routines as discussed in Step 200 of FIG. 2A). The method shown in FIG. 2D may be performed by, for example, a combination of the model lifecycle manager (e.g., 105, FIG. 1A) and one or more of the servers (e.g., 107A-107N, FIG. 1A).

While FIG. 2D is illustrated as a series of steps, any of the steps may be omitted, performed in a different order, additional steps may be included, and/or any or all of the steps may be performed in a parallel and/or partially overlapping manner without departing from the invention.

Initially, in Step 260, a model initial development phase is executed based on one or more criteria to obtain a set of production ready models. In one or more embodiments, the methods discussed above in FIGS. 2B and 2C may be part of the model initial development phase being executed in Step 260. The criteria used in the model initial development phase may be different from the trigger conditions discussed above in FIGS. 2B and 2C (e.g., the criteria may be additional parameters used to evaluate processes being executed during the model initial development phase).

In one or more embodiments, the model initial development phase may be separated into two stages: a first stage of model evaluation and a second stage of model hyperparameter tuning. The model initial development phase may have more than two stages without departing from the scope of one or more embodiments disclosed herein. Each of these two stages are discussed below in more detail.

In one or more embodiments, the model evaluation stage of the model initial development phase may be evaluated based on the criteria of, but are not limited to: model accuracy, a total amount of computing resources required to complete the model evaluation stage, a time to complete (TTC) the model evaluation stage, and model latency), a user's computing resource usage budget (e.g., limit), etc. In one or more embodiments, the user's computing resource usage budget may be determined by comparing a user's total monetary budget for executing the model initial development phase against the cost of using each unit of computing resource (e.g., monetary cost of using every 1 GB of computing resources). The cost of using each unit of computing resource may vary based on when the computing resource is being utilized (e.g., the monetary cost of using every 1 GB of computing resources may be less on a weekend compared to a weekday). Other criteria may be used to evaluate processes (e.g., steps) being executed during the model evaluation stage without departing from the scope of one or more embodiments disclosed herein.

In one or more embodiments, as a first step of the model evaluation stage, models are trained for one epoch to capture information associated with the one-epoch training. This information may be, but is not limited to, for each of the models: the amount time consumed (e.g., used) to complete the one-epoch training, the amount of computing resources consumed (e.g., used) to complete the one-epoch training, model accuracy, etc. In one or more embodiments, the models being trained may be the same models obtained in either Step 220 of FIG. 2B or Step 240 of FIG. 2C. Alternatively, the models being trained may be any models from the model catalog (or from any other source) selected by a user.

In one or more embodiments, the one epoch may be one iteration of training for each of the models. Alternatively, the one epoch may be one training cycle based on a predetermined amount of time set by a user.

In one or more embodiments, as a second step of the model evaluation stage, each model's captured information associated with the one-epoch training is evaluated to determine whether any models should be pruned. More specifically, the captured information may be compared against the user's computing resource usage budget to determine whether any of the models to not fit within a structure of this criteria. For example, assume that three models (model A, model B, model C) are trained for one epoch and that the user's computing resource usage budget is 20 GB of computing resources. Further assume that the user has required, based on the user's computing resource usage budget of 20 GB, a minimum model accuracy of 90% and that no models consuming more than 3 GB of computing resources after one epoch of training should be selected. Model A's result after one epoch is the consumption of 2 GB of computing resources with an accuracy of 95%, model B's result after one epoch is the consumption of 1 GB of computing resources with an accuracy of 90%, and model C's result after one epoch is the consumption of 4 GB of computing resources with an accuracy of 95%. In such an example, model C will be pruned for not meeting the requirements defined by the user that no models consuming more than 3 GB of computing resources after one epoch of training should be selected).

Although a specific example for pruning models based on the criteria of the user's computing resource usage budget is described above, other methods of pruning models using the user's computing resource usage budget as a threshold may be applied without departing from the scope of one or more embodiments.

In one or more embodiments, as a third step of the model evaluation stage, a total amount time consumed (e.g., used) by each model to complete the one-epoch training is aggregated into the TTC. This TTC does not include the completion times associated with models that have been pruned in the second step of the model evaluation stage. More specifically, the TTC is the total amount of time consumed by each of the models that are not pruned in step two to completed the one-epoch training.

In one or more embodiments, the TTC aggregated in step three may be used to determine a model training schedule for executing additional training on all models that have not been pruned in step two. This model training schedule may be executed at any time. Alternatively, this model training schedule may be executed during non-peak hours (e.g., a period of time where there is little to no model training routines being executed by the system (100)) such that more computing resources are available for the additional training, a period of time where the monetary cost of using every 1 GB of computing resources is at its lowest, etc.).

In one or more embodiments, as a third step of the model evaluation stage, additional training is executed on the models that have not been pruned in step two during the model training schedule determined in step three. Additionally, the fourth step of the model evaluation stage may be divided into at least three (or any number) of sub-steps.

More specifically, in sub-step one of step four, an overall change (e.g., a delta) in the model accuracy may be recorded after the models have been additionally trained for a predetermined number (e.g., 3 or any whole non-zero number) of epochs. This delta in the model accuracy may be used to determine whether any of the current models should be pruned. For example, a user may set the condition, based knowing that the user's computing resource usage budget is 20 GB, that any models being subjected to the additional trainings that do not exhibit a delta of at least 3-5% in model accuracy should be pruned. Other conditions may be set to prune the models in additional training based on the user's computing resource usage budget.

In one or more embodiments, in sub-step two of step four, a final accuracy of all the models being subjected to additional training may be projected (or determined) based on the delta in the model accuracy after the predetermined number of epochs being completed. The user may be notified of the final accuracy and determine whether any of the models (e.g., models not fitting within a user's desired accuracy value) should be pruned based on the user's computing resource usage budget.

In one or more embodiments, in sub-step three of step four, during any time that step four is being executed, a total amount of computing resources consumed may be determined. This determination may be done multiple times, each after a predetermined period of time has passed since the previous determination is completed. This total amount of computing resources consumed may include all of: the amount of computing resources already consumed above in step one of the model evaluation stage and the amount of computing resources consumed so far during the additional training process of step four at the point in time when the total amount of computing resources consumed is being determined. Once the total amount of computing resources consumed is determined, the total amount of computing resources consumed is compared against the user's computing resource usage budget. If it is determined, based on the comparison, the total amount of computing resources consumed has exceeded the user's computing resource usage budget, the process of step four is stopped and the predicted accuracy of each model at the time the process of step four is stopped is notified to the user. The user may then select the production ready models from this list of models based on the predicted model accuracies. Alternatively, if the total amount of computing resources consumed has not yet exceeded the user's computing resource usage budget, the processes of step four continue until the next determination indicates that the user's computing resource usage budget has been exceeded.

Although step four of the model evaluation process has been described above as having three sub-steps, each of the sub-steps may be performed in any order without departing from the scope of one or more embodiments disclosed herein as long as the user's computing resource usage budget has not been exceeded. Additionally, certain sub-steps (e.g., sub-steps one and two) may be omitted or repeated several times based on the user's preferences without departing from the scope of one or more embodiments disclosed herein.

In one or more embodiments, as a fifth step of the model evaluation stage, the predicted model accuracies of all models subjected to the additional model training of step four is generated and stored to be presented to the user. The user may then select the production ready models from this list of models based on the predicted model accuracies. This fifth step may only be executed if it is determined that the all of the processes associated with step four have been completed without the user's computing resource usage budget being exceeded.

Turning now to the second stage (e.g., the model hyper-parameter tuning stage) of the model initial development phase, hyper-parameters of the models may be tuned based one or more criteria discussed above in the first stage. In one or more embodiments, the hyper-parameter tuning may be executed using processes such as, but are not limited to: grid search, random search, Bayesian optimization, etc. Other hyper-parameter tuning processes may also be utilized without departing from the scope of one or more embodiments disclosed herein.

In one or more embodiments, the model hyper-parameter tuning stage may be its own process that is independent and distinct from the processes discussed above in the first stage of the model initial development phase. Alternatively, the model hyper-parameter tuning stage may be executed as part of stage four of the first stage of the model initial development phase.

In one or more embodiments, each of the above-discussed hyper-parameter tuning processes may include a maximum iteration criteria. The maximum iteration criteria may be based on the user's computing resource usage budget. For example, if only one of the hyper-parameter tuning process is used and a single iteration of this process costs 2 GB. The maximum iteration of this hyper-parameter tuning process may be 10 in view of a user's computing resource usage budget of 20 GB.

In one or more embodiments, the model hyper-parameter tuning stage may be broken down into three (or any number of) steps. More specifically, in step one, each model (e.g., the models that are left for additional training at the start of step four of the model evaluation stage) are trained based on one set of hyper-parameters. Each set of hyper-parameters may include at least one hyper-parameter. In the event that the set of hyper-parameters includes more than one hyper-parameter, the training based on the set of hyper-parameter may be an iterative training process covering all of the hyper-parameters in the set.

In one or more embodiments, in step one of the model hyper-parameter tuning stage, information associated with the one set of hyper-parameter training are captured. This information may be, but is not limited to, for each of the models: the amount time consumed (e.g., used) to complete the one set of hyper-parameter training, the amount of computing resources consumed (e.g., used) to complete the one set of hyper-parameter training, model accuracy, etc.

In one or more embodiments, the maximum iteration of one or more hyper-parameter tuning process is calculated using the information captured in above step one of the model hyper-parameter tuning stage and the user's computing resource usage budget. For example, the maximum iteration may be the user's computing resource usage budget divided by a total of the computing resources consumed (e.g., used) to complete the one set of hyper-parameter training for all of the models.

In one or more embodiments, in step three of the model hyper-parameter tuning stage, a total amount time consumed (e.g., used) by each model to complete the one set of hyper-parameter training is aggregated into another instance of the TTC. This instance of the TTC may also be used (in addition to the above-discussed instance of the TTC) to determine the above-discussed model training schedule for executing the hyper-parameter tuning as part of the additional training (e.g., step four of the model evaluation stage) on all models that have not been pruned in step two of the model evaluation stage.

Turning now to Step 262 of FIG. 2D, in Step 262, a model production phase is executed using the set of production ready models. The model production phase may be executed based on a set of criteria identical to (or different from) the set of criteria discussed above in the model initial development phase. For example, the criteria of the model production phase may additionally include, but is not limited to: a redundancy level of a model in production (also referred to herein as "model redundancy level"), model latency, and a user's computing resource usage budget for the model production phase. In one or more embodiments, the user's computing resource usage budget for the model production phase may be the same (or different from (e.g., as part of an aggregate budget)) the user's computing resource usage budget for the model initial development phase discussed above in Step 260.

In one or more embodiments, multiple instances of a single model (from the set of production ready models) may be deployed in production as part of the model production phase. This deployment of the multiple instances may advantageously provide better redundancy, load balancing, and improved model latency. In one or more embodiments, hardware accelerators (e.g., GPU accelerators) may also be used during the deployment of the multiple instances of the single model to further improve model latency. The use of hardware accelerates may increase the amount (e.g., may incur an additional amount) of computing resources consumed to deploy a model.

In one or more embodiments, the deployment of multiple instances of the single model may be managed as part of the model lifecycle based on the set of criteria. This will be discussed as a series of steps associated with the model production phase.

In one or more embodiments, as step one of the model production phase (more specifically, step one in the deployment of multiple instances of a model from the set of production ready models), a single trial instance of the model to be deployed to production is executed in different hardware configurations (e.g., a hardware configuration using hardware accelerators and a hardware configure without using hardware accelerators). The amount of computing resources consumed by each single trial instance may be captured and stored. A model latency value may also be captured and stored for each single trial instance.

In one or more embodiments, in step two of the model production phase, a single hardware configuration is selected from the different hardware configurations used to deploy the single trial instance of the model. This single hardware configuration may be selected based on a model redundancy threshold set by a user and the user's computing resource usage budget for the model production phase while also considering either or both the amount of computing resources consumed by each single trial instance and the model latency value for each single trial instance. In other words, the single hardware configuration is the configuration with results that best fits the various criteria set by the user.

In one or more embodiments, in step three of the model production phase, multiple instances of the model is deployed using the selected hardware configuration. The number instances deployed may be based on a model redundancy criteria set by the user.

In one or more embodiments, in step four of the model production phase, a model latency of the model is determined after the multiple instances of the model have been deployed. This model latency may be an aggregate of the model latencies of each deployed instance of the model. In one or more embodiments, additional instances of the model may be deployed (if the deployment of these additional instances would not cause the required computing resources to exceed the user's computing resource usage budget for the model production phase) if the model latency determined in this step is lower than a model latency threshold set by a user for the multiple instance deployment of the model.

Turning now to Step 264, a model update phase is executed on at least one model in the model production phase. In one or more embodiment, the model update phase is executed to retrain one or more models in production using a new set of training data. The model update phase may be executed based on a set of criteria identical to (or different from) the set of criteria discussed above in the model initial development phase. For example, the model update phase may be executed based on an additional criteria of the user's computing resource usage budget for model retraining.

More specifically, after a predetermined period has passed since a model has been deployed (e.g., one month, three weeks, every quarter, etc.) but before the user's resource usage budget for the model production phase has been exceeded, the model accuracy of a model in production may be determined. Additionally, an amount of data produced by the model while the model is in production may also be determined. In one or more embodiments, a model in production may be determined to need retraining if either: (i) the model accuracy is lower than a model accuracy threshold set by a user; or (ii) the amount of data produced by the model has exceeded a data received threshold set by the user.

In one or more embodiments, after determining all of the models in production that need to be retrained (e.g., a total number of models that need retraining), the total number of models that need retraining is evaluated against the user's computing resource usage budget for model retraining to determine how many models among the total number of models that need retraining can retrained without exceeding the user's computing resource usage budget for model retraining. All models needing retraining that is determined to fit within the user's computing resource usage budget for model retraining are retrained (e.g., using the processes of FIG. 2B and/or FIG. 2C), and a best model within these models is pushed back into the model production phase.

Figure 3A:
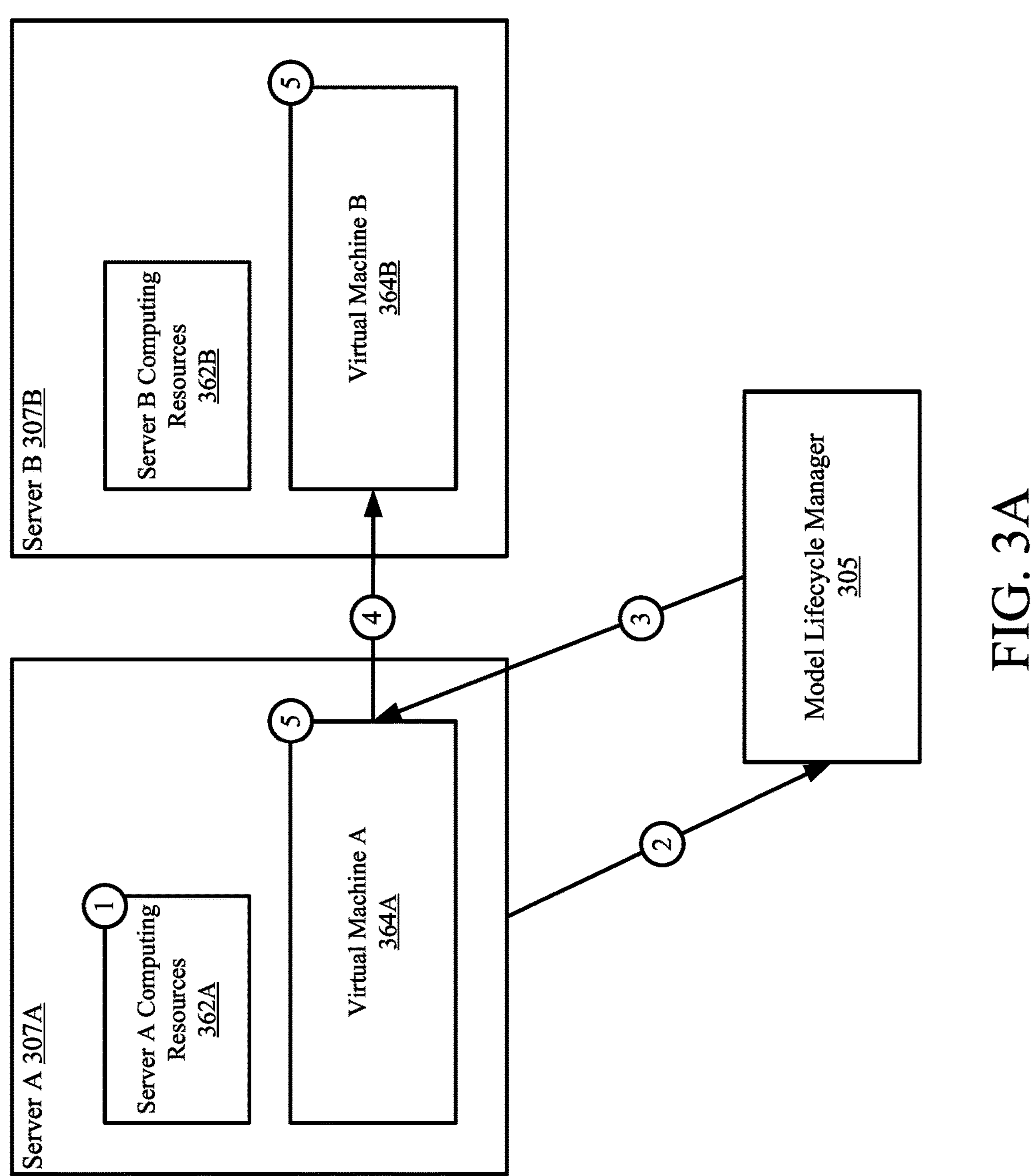
FIG. 3A-3B show an implementation example in accordance to one or more embodiments.
Figure 3B:
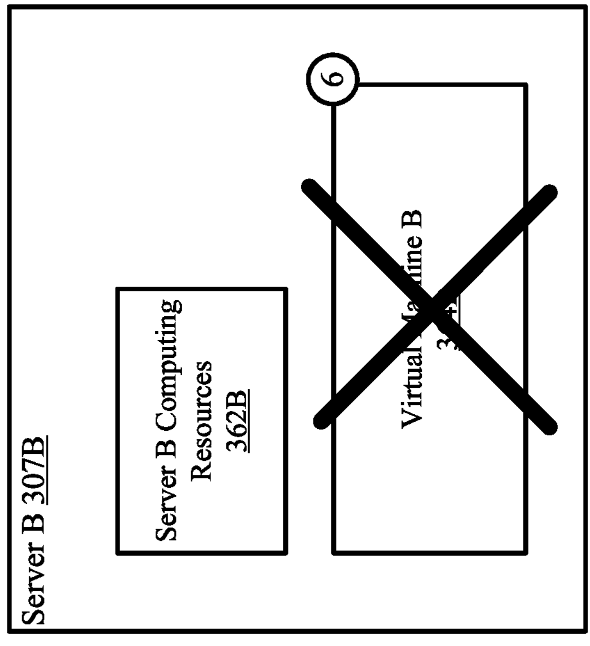
Figure 3B:
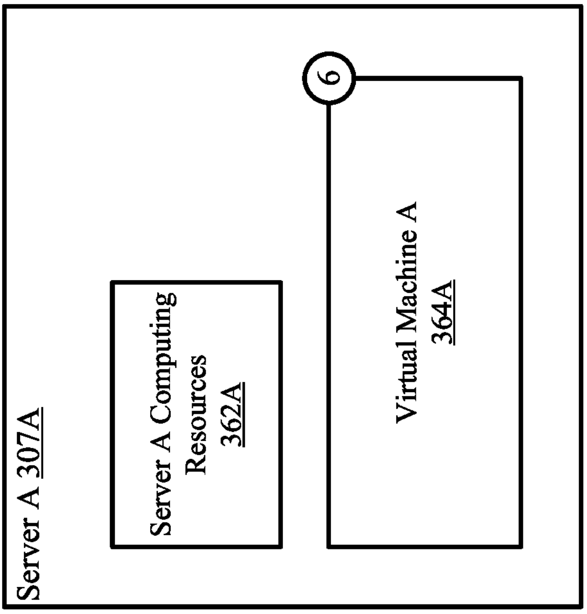
Figure 3B:

FIGS. 3A-3B show an implementation example in accordance with one or more embodiments. The numbers in the brackets below, e.g., "[1]", correspond to the same circled numbers in FIGS. 3.1-3.2.

BEGINNING OF EXAMPLE

As shown in FIG. 3A, assume that a single instance of a model training routine is being executed across two virtual machines (VM A (364A) and VM B (364B)) hosted on two servers (server A (307A) and server B (307B), respectively). This may be because neither server A (307A) nor server B (307B) had enough server computing resources (362A, 362B) to single-handedly execute the entire single instance of the model training routine when a request to execute the single instance of the model training routine was first received.

Now, assume that server A (307A) suddenly determines that one or more of the server A computing resources (362A) occupied by a different process has become available (e.g., is no longer being used by any processes) [1]. In response to this determination, server A (362A) transmits a notification indicating the same (e.g., a notification including network resource information) to the model lifecycle manager (305) [2].

The model lifecycle manager (305) analyzes the network resource information in the notification from server A (307A) and transmits a notification including a recalibration recommendation (compiled based on the network resource information) to VM A (364A) executing the single instance of the model training routine [3]. VM A (364A) receives and analyzes the recalibration recommendation, determines that recalibration should be executed on the model training routine such that an entirety of the model training routine is to be executed on only VM A (364A), and transmits a notification to VM B (364B) notifying VM B (364B) of the recalibration [4]. Said another way, at [4] VM A (364A) determines that the additional server A computing resources (362A) that became available will allow VM A (364A) to single-handedly execute the model training routine that is currently being spread across the two VMs.

Upon receiving the notification from VM A (364A), VM B (364B) (as well as VM A (364A) waits for a predetermined waiting period before executing the calibration to move the model training routine over entirely to VM A (364A) [5]. Turning now to FIG. 3B, the predetermined waiting period has elapsed, all data associated with the model training routine on VM B (364B) has been migrated (e.g., recalibrated) over to VM A (364A), and VM B (364B) has been removed (e.g., deleted) from server B (307B) to free up server B computing resources (362B) previously occupied by VM B (364B) [6].

End of Working Example

Figure 4:
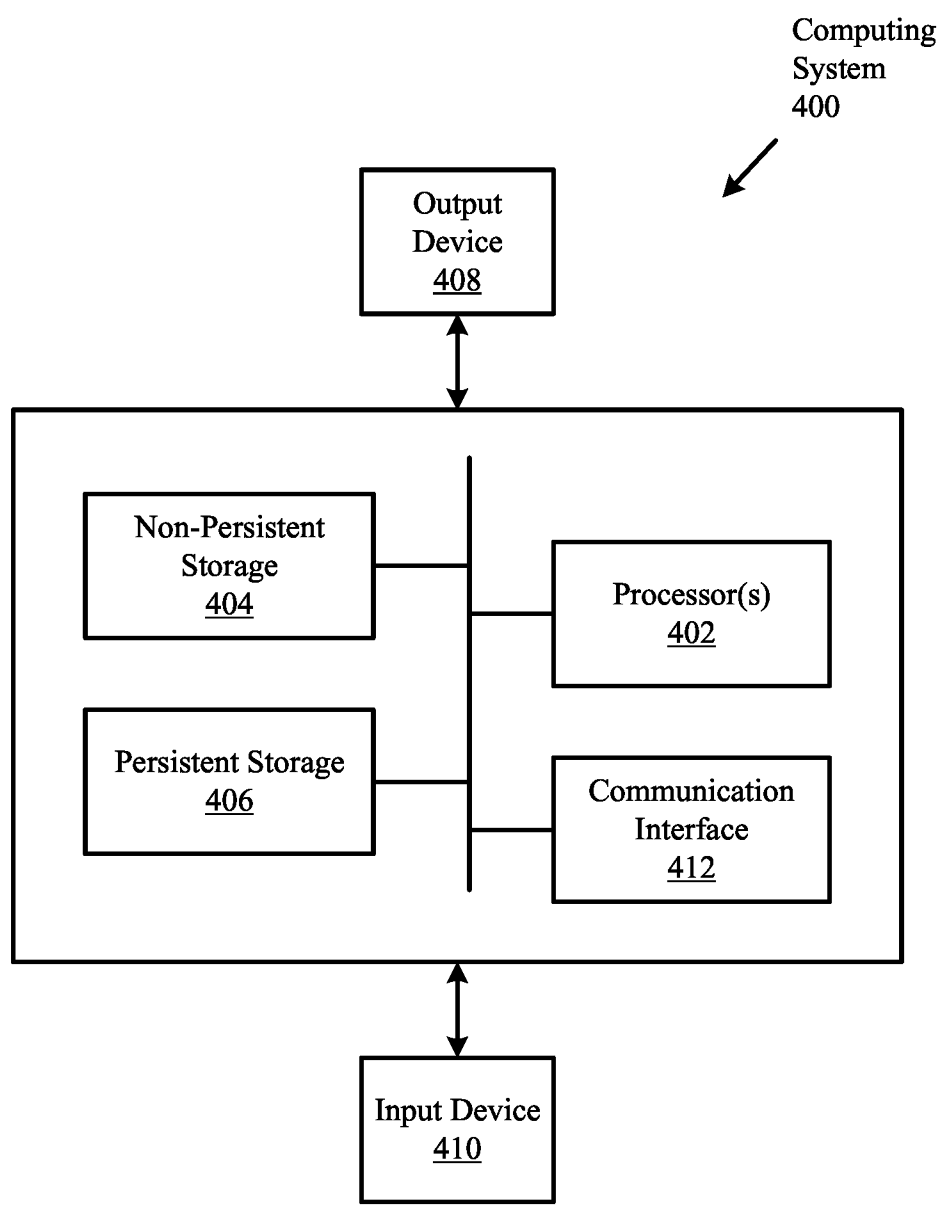
FIG. 4 shows a computer system in accordance with one or more embodiments described herein.

FIG. 4 shows a computer system in accordance to one or more embodiments.

Embodiments disclosed herein may be implemented using computing devices. FIG. 4 shows a diagram of a computing device in accordance with one or more embodiments disclosed herein. Computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), communication interface (412) (e.g., Bluetooth interface, infrared interface, network interface, optical interface, etc.), input devices (410), output devices (408), and numerous other elements (not shown) and functionalities. Each of these components is described below.

In one embodiment disclosed herein, computer processor (s) (402) may be an integrated circuit for processing instructions. For example, the computer processor(s) may be one or more cores or micro-cores of a central processing unit (CPU). Computing system (400) may also include one or more input devices (410), such as a touchscreen, keyboard, mouse, microphone, touchpad, electronic pen, or any other type of input device. Further, communication interface (412) may include an integrated circuit for connecting computing system (400) to a network (not shown) (e.g., a local area network (LAN), a wide area network (WAN) such as the Internet, mobile network, or any other type of network) and/or to another device, such as another computing device.

In one embodiment disclosed herein, computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to computer processor(s) (402), non-persistent storage (404), and persistent storage (406). Many different types of computing devices exist, and the aforementioned input and output device(s) may take other forms.

The advantages discussed above throughout the detailed description should be understood as being examples associated with one or more problems being solved by embodiments of the invention. However, one or more embodiments of the invention disclosed herein should not be limited to solving the same/similar problems. The disclosed invention is broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A model selection method comprising:

receiving a request to train or validate a plurality of machine learning models, wherein the request comprising training data and one or more trigger conditions, wherein the trigger conditions specify;

model accuracy;

model latency;

model size;

amount of computing resources required for training; and requirements and restrictions;

obtaining the machine learning models from a model catalog;

training the machine learning models using the training data to obtain results for each of the one or more trigger conditions;

selecting, based on the results of each of the one or more trigger conditions, on the requirements and restrictions, and from among the machine learning models, a best model to be pushed to production, wherein the requirements and restrictions specify lower model latency should be prioritized over model accuracy and that model accuracy should be at least 90%;

updating, in response to the selecting, the model catalog, wherein updating the model catalog comprises:

removing the best model and all data associated with the best model from the model catalog; and ranking non-selected machine learning models of the model catalog based on the results of the selecting;

obtaining, after the updating, a plurality of hardware configurations and testing the best model on each hardware configuration within the plurality of hardware configurations to obtain configuration results, wherein the configuration results are the results of the pairing of the best model and each hardware configuration;

selecting, based on the configuration results and from the plurality of hardware configurations, a best hardware configuration; and implementing, based on selecting the best hardware configuration, the best model using the best hardware configuration.

2. The model selection method of claim 1, wherein the training data comprises ground-truth data.

3. A system comprising:

a memory; and a processor coupled to the memory, wherein the processor is configured to execute a model selection method comprising:

receiving a request to train or validate a plurality of machine learning models, wherein the request comprising training data and one or more trigger conditions, wherein the trigger conditions specify;

model accuracy;

model latency;

model size;

amount of computing resources required for training; and requirements and restrictions;

obtaining the machine learning models from a model catalog;

training the machine learning models using the training data to obtain results for each of the one or more trigger conditions;

selecting, based on the results of each of the one or more trigger conditions, on the restrictions, on the requirements, and from among the machine learning models, a best model to be pushed to production, wherein the requirements specify lower model latency should be prioritized over model accuracy and that model accuracy should be at least 90%;

updating, in response to the selecting, the model catalog, wherein updating the model catalog comprises:

removing the best model and all data associated with the best model from the model catalog; and ranking non-selected machine learning models of the model catalog based on the results of the selecting;

obtaining, after the selecting, a plurality of hardware configurations and testing the best model on each hardware configuration within the plurality of hardware configurations to obtain configuration results, wherein the configuration results are the results of the pairing of the best model and each hardware configuration;

selecting, based on the configuration results and from the plurality of hardware configurations, a best hardware configuration; and implementing, based on selecting the best hardware configuration, the best model using the best hardware configuration.

4. The system of claim 3, wherein the training data comprises ground-truth data.

* * * * *